United States Patent [19]

McElwain

[11] 3,777,510

[45] Dec. 11, 1973

[54] POWER TRANSMITTING JOINT ARRANGEMENT

[75] Inventor: John C. McElwain, Rochester, Mich.

[73] Assignee: Rockwell International Corporation, Pittsburgh, Pa.

[22] Filed: Aug. 12, 1971

[21] Appl. No.: 171,239

[52] U.S. Cl................................................ 64/17 A
[51] Int. Cl............................................... F16d 3/26
[58] Field of Search................ 64/17 R, 17 A, 17 S, 64/18, 21

[56] References Cited
UNITED STATES PATENTS

| | | | |
|---|---|---|---|
| 3,174,813 | 3/1965 | Selz | 64/17 A |
| 3,470,711 | 10/1969 | Kayser | 64/17 A |
| 3,481,159 | 12/1969 | Kayser | 64/17 A |
| 2,629,992 | 3/1953 | Anderson | 64/17 A |
| 3,218,692 | 11/1965 | Kayser | 64/17 A |

Primary Examiner—Charles J. Myhre
Assistant Examiner—Randall Heald
Attorney—John R. Bronaugh et al.

[57] ABSTRACT

A spider used in a power transmitting joint has a plurality of projecting trunnions that each receive a cup-shaped bearing capable of rotational movement relative thereto. An integral resilient means has end surface sealing means surrounding each trunnion and in sealing contact with the surface of the end of each bearing proximate the spider while allowing relative rotational movement between each bearing and trunnion.

1 Claim, 5 Drawing Figures

PATENTED DEC 11 1973

3,777,510

INVENTOR
John C. McElwain

INVENTOR
John C. McElwain

POWER TRANSMITTING JOINT ARRANGEMENT

BACKGROUND AND OBJECTS OF THE INVENTION

This invention relates to power transmitting joints wherein sealing contact is desired between joint members rotating relative to each other. In particular, the invention relates to providing a one-piece, integral, resilient seal element on a spider member of a universal joint, having a four trunnion center cross, the trunnions of which rotatably mount cup-shaped bearings. Usually, these cup-shaped bearings are connected to the joint yokes and move with the yokes relative to the center cross trunnions. To facilitate this movement each bearing has an internal surface which is lubricated to assure free rotation relative to a trunnion surface. For trouble free joint operation, it is desirable to seal the interface between each internal bearing surface and corresponding trunnion to prevent the entry of dirt and contaminents usually present in the environment of the joint.

In the prior art, it is known to provide a sealing washer surrounding each trunnion and contacting the inner end of the cup bearing to retain the lubricant therein and to protect against the entry of dirt and other matter from the outside. Such a washer is positioned by a washer seat machined about each trunnion on the body of the center cross. An example of such an expedient is in U. S. Pat. No. 2,916,896, entitled "Universal Joint" and issued to Miller on Dec. 15, 1959, disclosing sealing rings made of a resilient material and having an annular lip which contacts the inner end of the bearing. In assembling a universal joint as taught by Miller, it is necessary to individually mount each sealing ring on each trunnion by a manual mounting step.

It is an object of this invention to provide a novel sealing means that is a one-piece, resilient sealing member having plural sealing means and capable of being machine molded about the cross portion of a four trunnion spider. A major advantage of such an integral sealing member is that it can be accurately and inexpensively machine molded about a spider faster than the slower and cumbersome manual method of individually mounting four sealing rings. In addition, this invention eliminates the need to machine sealing washer seats on the joint spider.

It is a further object of this invention to provide an improved sealing member having two endless sealing projections or lips contacting each bearing and effectively preventing access of foreign matter to the bearing surface.

Another object of the invention is to provide a sealing member that is held in position against possible outward movement caused by centrifugal forces arising during joint operation. By thus preventing movement of the sealing member proper sealing contact is maintained.

SUMMARY OF THE INVENTION

A spider used in a power transmitting joint has a plurality of projecting trunnions which each receive a cup-shaped bearing capable of rotational movement relative thereto. An integral resilient means has end surface sealing means surrounding each trunnion and in sealing contact with the surface of the end of each bearing proximate the spider while allowing relative rotational movement between each bearing and trunnion.

DESCRIPTION OF THE INVENTION

Figure 1:
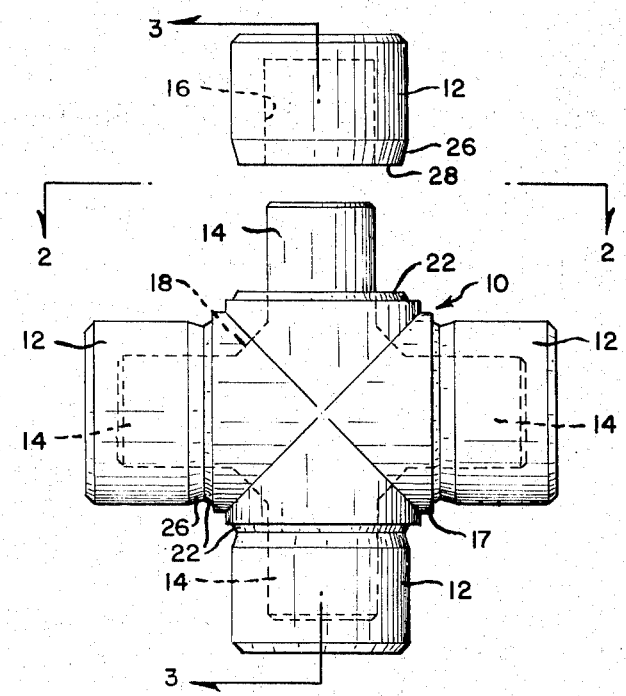
FIG. 1 is a elevation view of a universal joint trunnion spider and bearing arrangement of this invention with one cup bearing in an exploded position.
Figure 2:
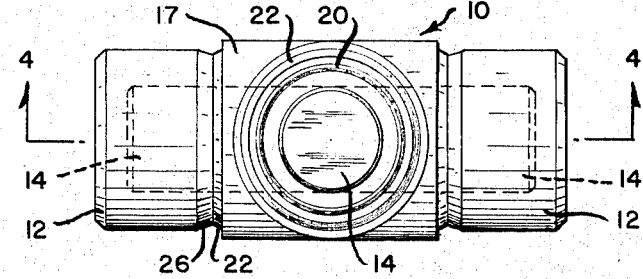
FIG. 2 is an end view taken along the line 2—2 of FIG. 1.
Figure 3:
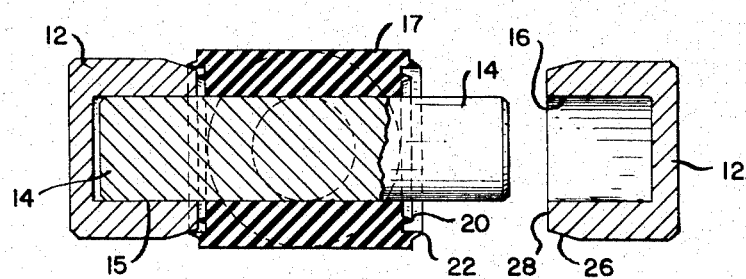
FIG. 3 is a section view taken along line 3—3 of FIG. 1.

Referring to the drawings, a universal joint center cross or trunnion spider 10 carries a plurality of cup-shaped bearings 12 which are end rotatably mounted on the end of one of the spider trunnions 14. Portions 15 of the outer surfaces of the trunnions are machined to a close tolerance dimension to cooperate with the similarly machined interior surfaces 16 of the bearings to provide a suitable bearing interface. Bearings 12 are adapted to be conventionally connected to apertured yoke bifurcations (not shown) attached to rotating members such as drive shafts. As is conventional, this arrangement allows pivotal movement in transverse planes of the rotating members for universal movement. The spider 10 is formed from a four armed forging.

A one-piece sealing member 17 is molded on the spider 10, and completely encapsulates the main body portion 18 of the spider. "Neoprene" has been found to be satisfactory resilient elastomeric material from which the member 17 can be formed. Other suitable synthetics or rubber having suitable characteristics of flexibility and elasticity for sealing purposes may also be used. Integrally formed on each end of each of the surfaces of sealing member 17 that surround the trunnions is a pair of endless inner and outer sealing projections 20 and 22. These projections are shaped as radially spaced, concentric, annular tapered lips. The sealing projections are located between the portion 18 and the end of each trunnion 14.

Figure 4:
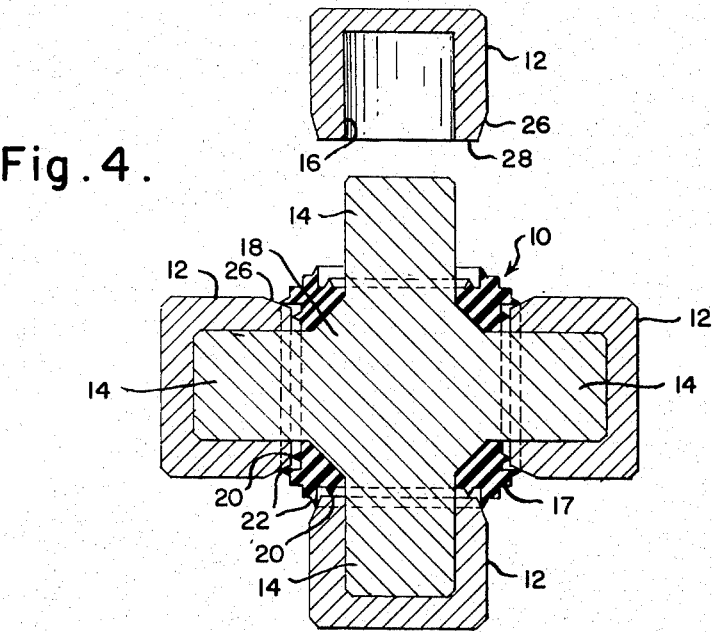
FIG. 4 is a section view taken along the line 4—4 of FIG. 2.
Figure 5:
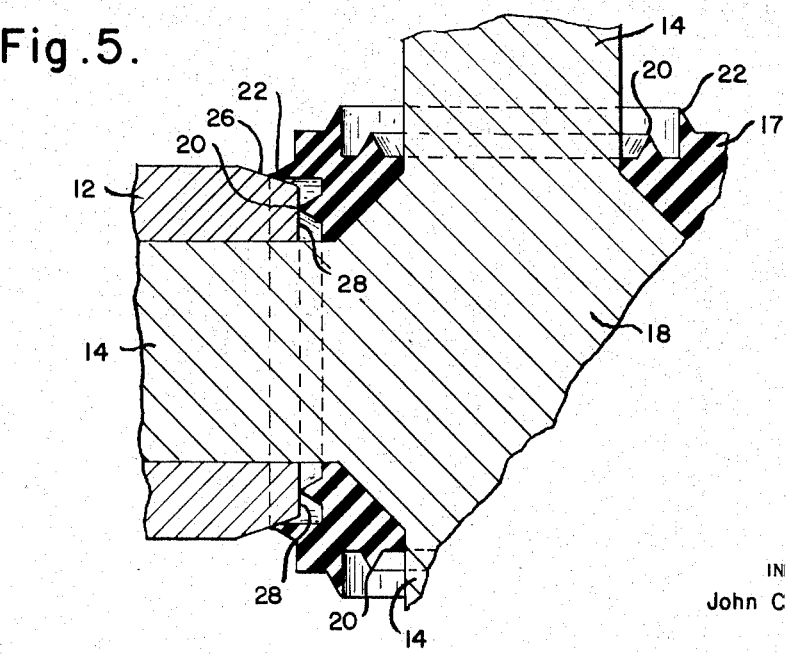
FIG. 5 is an enlarged detail view of a portion of FIG. 4.

The end of each bearing 12 proximate the spider has a frusto-conical outer surface 26 and an adjacent annular flat end surface 28. As shown in FIGS. 4 and 5, each outer tapered projection 22 is in sealing contact with a frusto-conical surface 26, while each inner tapered projection 20 is in sealing contact with an end surface 28. Because the sealing projections 20 and 22 are resilient, slight axial movement of the cupped bearings will not break the sealing contact. This arrangement allows the sealing contact to be maintained while allowing relative rotational movement between associated bearings and trunnions. Inner sealing projections 20 limit axial movement of the bearings towards portion 18 and thus aid in the axial positioning of the bearings.

The double sealing projections additionally retain lubricant placed within bearings 12 to lubricate the interface between surfaces 15 and 16 and also prevent dirt and other foreign matter from contacting trunnions 14. Since sealing member 17 is an integral molded piece which surrounds the portion 18, centrifugal forces arising during universal joint operation are unable to cause it to move relative to the spider. Thus sealing contact is maintained as axial movement of the sealing member along the trunnions is not possible.

It should be understood that the integral sealing member 17 is not limited to use with a universal joint, but also may be used with any type power transmitting joint where resilient sealing contact is desired between relatively rotatable members.

It thus may be seen that this invention provides in a universal joint arrangement for the establishment of a seal to protect the cup bearing-trunnion interface by means of a one-piece, molded sealing member formed about the center portion of the spider. Inclusion of such a member eliminates the need for discrete sealing washers and the attendant manual task of assembling each of the washers on the spider. Also, the need for machined washer seats on the spider is eliminated. In addition, this arrangement serves to aid in the maintenance of the desired seals since the integral sealing member positively is located and movement of this member relative to the spider prevented.

It is to be understood that the above detailed description of the present invention is intended to disclose an embodiment thereof to those skilled in the art, but that the invention is not to be construed as limited in its application to the details of construction and arrangement of parts illustated in the accompanying drawings, since the invention is capable of being practiced and carried out in various ways without departing from the spirit of the invention. The language used in the specification relating to the operation and function of the elements of the invention is employed for purposes of description and not of limitation, and is not intended to limit the scope of the following claims beyond the requirements of the prior art.

What is claimed is:

1. In a power transmitting joint, a spider having a plurallity of projecting trunnions, a cup-shaped bearing receiving each trunnion and capable of rotational movement relative thereto, each bearing having a flat open end surface, a generally cylindrical radially outermost surface and a frusto-conical outer surface terminating at one of its extremities at said cylindrical surface and at the other of its extremities at said open end surface, and an integral resilient means surrounding each of said trunnions along a portion of the length of each of said trunnions and terminating part way along each of said trunnions in end surface sealing means in sealing contact with each of said bearings, said sealing means including radially spaced apart annular inner and outer sealing lips projecting from said resilient means and integral therewith, each of said inner lips abutting and deformed against a bearing flat end surface and each of said outer lips abutting and deformed against a frusto-conical outer surface.

* * * * *